US011153337B2

(12) United States Patent
Hu et al.

(10) Patent No.: US 11,153,337 B2
(45) Date of Patent: *Oct. 19, 2021

(54) METHODS AND SYSTEMS FOR IMPROVING BEACONING DETECTION ALGORITHMS

(71) Applicant: International Business Machines Corporation, Armonk, NY (US)

(72) Inventors: Xin Hu, White Plains, NY (US); Jiyong Jang, Ossining, NY (US); Douglas Schales, Ardsley, NY (US); Marc Stoecklin, White Plains, NY (US); Ting Wang, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,504

(22) Filed: Mar. 28, 2019

(65) Prior Publication Data
US 2019/0230109 A1 Jul. 25, 2019

Related U.S. Application Data

(63) Continuation of application No. 15/166,468, filed on May 27, 2016, now Pat. No. 10,284,584, which is a
(Continued)

(51) Int. Cl.
| | | |
|---|---|---|
| *H04L 29/06* | (2006.01) | |
| *G06F 21/00* | (2013.01) | |
| *G06F 21/55* | (2013.01) | |

(52) U.S. Cl.
CPC ......... *H04L 63/1425* (2013.01); *G06F 21/00* (2013.01); *G06F 21/552* (2013.01); *H04L 63/101* (2013.01)

(58) Field of Classification Search
CPC ....... H04L 63/00; H04L 63/02; H04L 63/029; H04L 63/10; H04L 63/101; H04L 63/104;
(Continued)

(56) References Cited

U.S. PATENT DOCUMENTS

| | | | | |
|---|---|---|---|---|
| 5,327,298 A | * | 7/1994 | Ottesen | ............ G11B 20/10009 360/46 |
| 5,412,658 A | | 5/1995 | Arnold et al. | |

(Continued)

FOREIGN PATENT DOCUMENTS

JP 2015-181226 A 10/2015

OTHER PUBLICATIONS

Noble, K., "Detecting Malicious Beacons", Mar. 11, 2014, [Retrieved Apr. 16, 2016], wwvv.biopspot.com, Retrieved from: < http://deviantpackets.bioqspot.com/2014/03/det.ect.inq-maiicious-beacons.html > (Year: 2014).*

(Continued)

*Primary Examiner* — Eric W Shepperd
(74) *Attorney, Agent, or Firm* — Jeffrey S. LaBaw, Esq.; McGinn I.P. Law Group, PLLC

(57) ABSTRACT

A method for improving a detection of beaconing activity includes receiving input data into a computer-implemented processing procedure at least one listing of at least one of time series data and candidate periods of potential beaconing activity. The input data is processed, to detect candidates of potential beaconing activity. By further evaluating the time series data using techniques used for evaluating an analog signal, the performance of detecting of potential beaconing activity is improved to eliminate false positive indications of beaconing activity and/or to provide indication of multiple interleaved periodicities of beaconing.

20 Claims, 10 Drawing Sheets

Related U.S. Application Data continuation-in-part of application No. 14/668,595, filed on Mar. 25, 2015, now Pat. No. 9,591,007.

(60) Provisional application No. 62/075,931, filed on Nov. 6, 2014.

(58) Field of Classification Search
CPC . H04L 63/14; H04L 63/1408; H04L 63/1425; H04L 63/16; H04L 2463/144; H04L 2463/146

See application file for complete search history.

(56) References Cited

U.S. PATENT DOCUMENTS

| | | | |
|---|---|---|---|
| 6,873,600 B1 | 3/2005 | Duffield | |
| 7,480,940 B1* | 1/2009 | Agbabian | H04L 63/1425 726/22 |
| 7,574,597 B1* | 8/2009 | Cousins | H04L 43/026 370/350 |
| 7,849,502 B1* | 12/2010 | Bloch | H04L 63/168 726/11 |
| 7,885,602 B1 | 2/2011 | Kelsey et al. | |
| 8,081,575 B2 | 12/2011 | Habetha | |
| 8,417,114 B1 | 4/2013 | Storey | |
| 8,578,493 B1 | 11/2013 | Cowan et al. | |
| 8,788,407 B1* | 7/2014 | Singh | G06Q 40/123 705/38 |
| 8,959,567 B1 | 2/2015 | Shen | |
| 8,977,575 B2 | 3/2015 | Das | |
| 9,043,894 B1* | 5/2015 | Dennison | H04L 63/1408 726/11 |
| 9,204,341 B2 | 12/2015 | Su | |
| 2001/0045901 A1 | 11/2001 | Auerbach | |
| 2003/0084148 A1* | 5/2003 | Cousins | H04L 63/1408 709/224 |
| 2003/0154181 A1 | 8/2003 | Liu | |
| 2004/0059935 A1* | 3/2004 | Cousins | H04L 63/1408 726/12 |
| 2005/0113090 A1 | 5/2005 | Sharony | |
| 2005/0124345 A1 | 6/2005 | Laroia et al. | |
| 2006/0010485 A1* | 1/2006 | Gorman | H04L 67/34 726/3 |
| 2007/0094725 A1* | 4/2007 | Borders | H04L 63/1408 726/22 |
| 2007/0155314 A1 | 7/2007 | Mohebbi | |
| 2008/0205292 A1 | 8/2008 | Denby | |
| 2008/0215411 A1 | 9/2008 | Hu | |
| 2009/0138573 A1* | 5/2009 | Campbell | H04L 63/145 709/218 |
| 2009/0235354 A1 | 9/2009 | Gray et al. | |
| 2010/0091702 A1 | 4/2010 | Luo et al. | |
| 2010/0292958 A1 | 11/2010 | Hathaway | |
| 2012/0023552 A1 | 1/2012 | Brown | |
| 2013/0028293 A1 | 1/2013 | Makh et al. | |
| 2013/0179593 A1* | 7/2013 | Dunlap | H04L 63/0209 709/244 |
| 2014/0258296 A1 | 9/2014 | Chen | |
| 2015/0269050 A1 | 9/2015 | Filimonov | |
| 2015/0341773 A1 | 11/2015 | Ribeiro | |

OTHER PUBLICATIONS

"Hypothesis Testing, Power, Sample Size and Confidence Intervals (Part 1)" [Online], Jun. 3, 2010 [Retrieved on: Aug. 18, 2018], B.H. Robbins Scholars Series, Retrieved from < https://pdfs.semanticscholar.org/presentation/40e0/3cee6a958840692725fa75632cb0ecede9f6.pdf > (Year: 2010).*

Geramifard, Omid "Hidden Markov Model-Based Methods in Condition Monitoring of Machinery Systems" [Online], Sep. 2, 2013, [ Retrieved on: Aug. 18, 2018], PhD Thesis, National University of SinaaDore. Retrieved from: < httDs://core.ac.uk/download/Ddf/48670067.Ddf > (Year: 2013).*

McCusker, et al., ("Deriving Behavior Primitives from Aggregate Network Features Using Support Vector Machines", 2013 5th International Conference on Cyber Conflict, pp. 27-45, K. Podins, J. Stinissen, M. Maybaum (Eds.) 2013 O NATO CCD COE Publications, Tallinn).

Noble, K., "Detecting Malicious Beacons", Mar. 11, 2014, [Retrieved Apr. 16, 2016], www.blogspot.com, Retrieved from: http://deviantpackets.blogspot.com/2014/03/detecting-malicious-beacons.html.

Cui, et al., "An Approach to Detect Malware Call-Home Activities", Dec. 16, 2013 [Retrieved on: Apr. 16, 2016], SANS institute, Retrieved from: https://www.sans.org/reading-room/whitepapers/dectection/approach-detect-malware-call-home-activities-34480.

United States Office Action dated Jul. 26, 2017 in U.S. Appl. No. 14/750,737.

United States Office Action dated Oct. 31, 2016, in U.S. Appl. No. 14/668,595.

United States Office Action dated Jan. 22, 2018, in U.S. Appl. No. 14/750,737.

Stone et al. "What Is at-test? and Why Is It Like Telling a Kid to Clean Up that Mess in the Kitchen?" [Online], Jun. 10, 2013 [ Retrieved on: Aug. 17, 2018], Minitab [blog.minitab.com], <cont.> (Year: 2013).

<cont.> Retrieved from: < http://blog.minitab.com/blog/statistics-and-quality-data-analysis/what-is-a-t-test-and-why-is-it-like-telling-a-kid-to-clean-up-that-mess-in-the-kitchen >.

Carlin et al. "4: Basic concepts of statistical reasoning: Hypothesis tests and the t-test" [Online], Nov. 14, 2000 [Retrieved on: Aug. 17, 2018], <cont.>.

<cont.> Retrieved from: < http://www.ugr.es/-fmocan/MATERIALES%20DOCTORADO/Statistics-for-Clinicians-4-Basic-Concepts-of-Statistical-Reasoning-Hypothesis-Tests-and-the-T-test.pdf > (Year: 2000).

Geramifard, Omid "Hidden Markov Model-Based Methods in Condition Monitoring of Machinery Systems" [Online], Sep. 2, 2013, [ Retrieved on: Aug. 18, 2018], PhD Thesis, National University of Singapore, Retrieved from: < https://core.ac.uk/download/pdf/48670067.pdf > (Year: 2013).

* cited by examiner

METHODS AND SYSTEMS FOR IMPROVING BEACONING DETECTION ALGORITHMS

This application is a Continuation Application of U.S. patent application Ser. No. 15/166,468 filed on May 27, 2016, now U.S. patent Ser. No. 10/284,584, which is a Continuation in Part of U.S. patent application Ser. No. 14/668,595 filed on Mar. 25, 2015, now U.S. Pat. No. 9,591,007, which is the Provisional Application No. 62/075,931 filed on Nov. 6, 2014.

BACKGROUND

The present invention relates to cyber security, and more specifically, to providing improved beaconing behavior detection by evaluating potential candidate period data as data points on a received signal to which statistical and communication theory principles can be applied.

Sophisticated cyber security threats, for example advanced persistent threats (APTs), employ strategies to infect end points within a security perimeter and instruct these machines (e.g., by means of a malware process) to issue regular callback traffic, hereinafter referred to as "beaconing", to a machine outside the perimeter of an organization (e.g., the Internet) controlled by an attacker. Other well-known cases employing beaconing traffic are botnet command and control infrastructures, where bots use such techniques to announce themselves and establish stealthy communication channels in order to receive instructions from the botnet master. In general, beaconing traffic can be characterized as regular (periodic) traffic (e.g., network connections, network packets) to a destination point. It is also noted that beaconing traffic is not necessarily generated by a malware process since beaconing traffic also occurs for benign, desirable network operations, such as occurs when a safe application sends out update requests.

Existing solutions to detect beaconing behavior employ pattern matching, statistical techniques, rate-based thresholds, and frequency analysis. For example, one conventional method uses Fourier transformation to analyze control plane traffic, looking for periodic signals that might indicate the presence of botnet.

These existing solutions are challenged with high false positive rates. Moreover, the algorithms often assume highly regular, consecutive, and periodic beaconing behavior. In reality the intervals are not strictly periodic, as endpoints dynamically join and leave the network, endpoints restart, gaps or noises exist in the observation, or malware may change its beaconing behavior. In addition, some malware use multiple periodicities, such as short intervals (e.g., seconds) for contact establishment and, after that, remain dormant for a longer period of time (e.g., hours or days). Existing frequency analysis method that detects only the top periodicity may lead to an incomplete picture of the beaconing behavior or they may fail to detect interleaved periodicities due to their seemingly irregular patterns.

In the identified application Ser. No. 14/668,595 (now U.S. Pat. No. 9,591,007), incorporated herein by reference, the present inventors presented a method of detecting beaconing behavior in which network records were preprocessed to identify candidate source and destination pairs for detecting beaconing behavior, each source and destination pair being associated with specific time intervals. The activity time interval information was then converted from the time domain into the frequency domain so that candidate frequencies could be determined from the source/destination information.

SUMMARY

The present invention can be viewed as an extension of this previously-disclosed method in that the present invention can be incorporated into that mechanism and because the present invention also discloses several methods to address main challenges faced by existing beaconing detection algorithms. These challenges include high noise level, high false positive rates, and lack of capabilities to detect multiple interleaved periodicities. A common pattern for these sophisticated cyber security attacks and threats, such as Advanced Persistent Threats (APTs) and targeted attacks, is that after the initial infection, the adversary controls the infected machines by establishing a stealthy communication channel between the malware process within the target infrastructure and the adversary's command and control (C2) infrastructure. This beaconing behavior can be characterized as a repeated or periodic sequence or sequences of connections between botnets and their control servers.

The present invention provides a system and several novel models applied to the statistical features of beaconing activities to improve the performance and capabilities of the existing beaconing detection algorithm such as described in the co-inventors' previously-filed co-pending application. There are several limitations of existing frequency based beaconing detection. First, although Fourier-transformation-based periodogram analysis is an effective tool for discovering candidate periodicities, it cannot determine whether such periodicities exist due to intrinsic repeated behavior or due to high frequency noises. Second, a time series can consist of multiple periodic behaviors interleaved with each other.

Existing solutions often detect only the top frequency in the periodogram, leading to an incomplete picture of the beaconing behavior. Last but not least, the discrete nature of existing approaches yields intrinsic quantization errors and sampling artifacts, which creates additional periodic components in the frequency domain, which will also result in potential false positives.

In comparison with the state-of-the-art beaconing methodology, the present invention is able to filter random noises and thus considerably reduce false detection by using statistical hypothesis testing and sampling rate characterization techniques. In addition, the present invention is able to detect multiple interleaved periodicities by separating each periodic component using a Gaussian Mixture Model. An advantage of this approach is that it can automatically determine the optimal number of periodic components without any prior knowledge.

DETAILED DESCRIPTION

Figure 1:
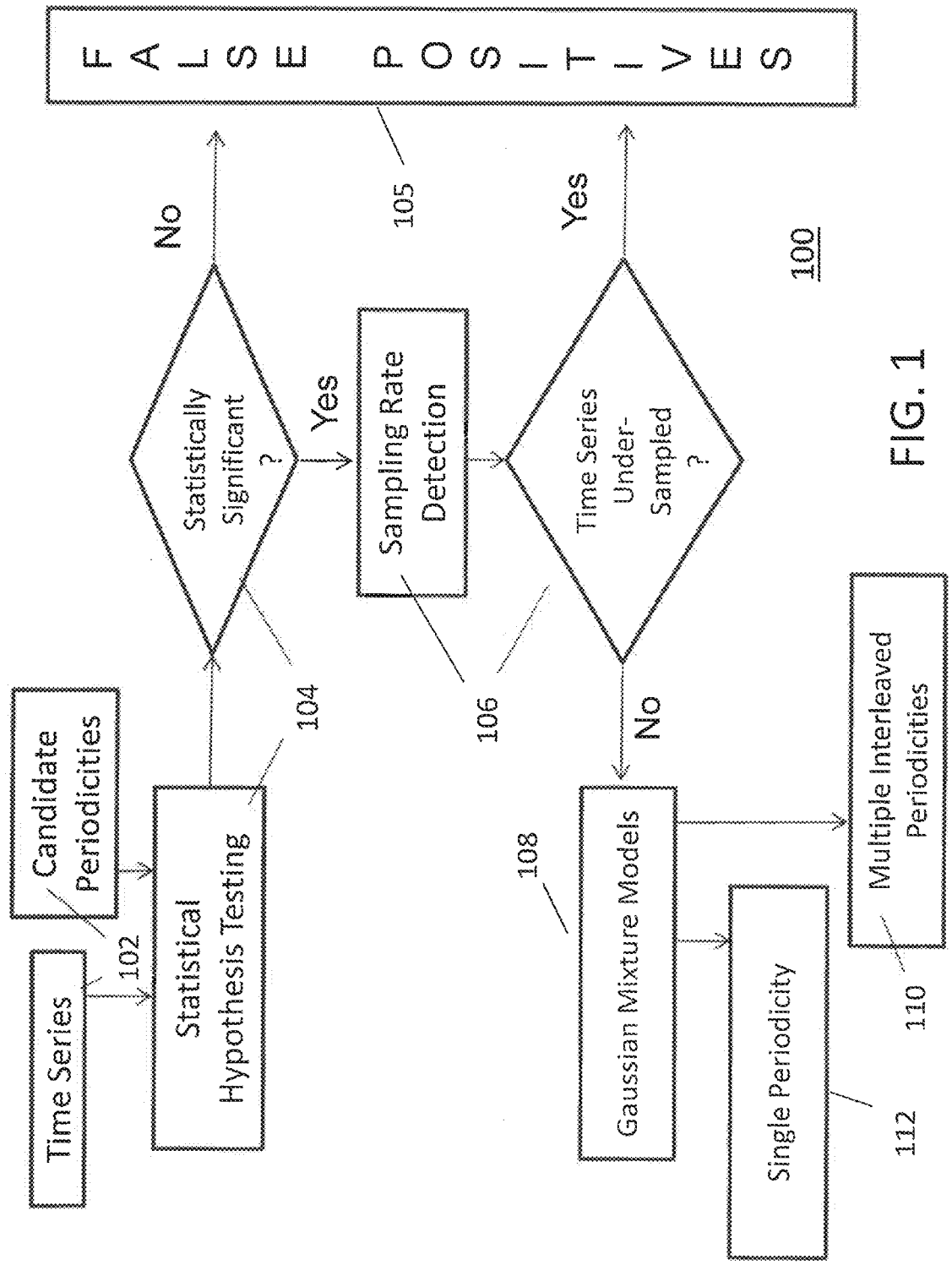
FIG. 1 illustrates sequential processing steps 100 for an exemplary embodiment of the present invention.

With reference now to FIG. 1, the present invention provides several improved methods for beaconing detection algorithms, any of which can be incorporated into conventional beaconing detecting methods such as demonstrated by the present inventors' above-identified co-pending application. In the summary format shown exemplarily in FIG. 1, given an input time series and a set of candidate periodicities 102 such as would be detected by and available in an existing beaconing detection algorithm, in one exemplary embodiment, the present invention presents three different processing methods 100 as a sequence of processing procedures:

1. Statistical Hypothesis Testing Processing Procedure

This processing procedure measures the statistical significance of the candidate periods 102, such that, given a pre-defined significance level, this processing procedure 104 determines whether there is enough statistical evidence to remove a candidate periodicity 102 as potential noise.

For example, in a very simple set of data used to intuitively demonstrate this first testing processing procedure without providing the many samples that would be necessary to reach a statistically-meaningful size, consider the following excerpt from a hypothetical activity interval list: [ . . . , 50, 51, 103, 48, 55, 54, 98, 51, 50, 54, 52, . . . ].

Upon completion of evaluation of an entire listing of periods of observed activity from one source/destination pair using this first processing procedure, it might be concluded by this processing that candidate period P1=50 seconds was acceptable, whereas period P2=54 seconds is rejected. More details of this method is provided in the description that follows this summary section but this first method can be viewed as using statistical theory as a basis to evaluate data for potential beaconing activity.

2. Detecting Under-Sampled Time Series Processing Procedure

This processing procedure 106 eliminates false detected periodicities that are due to insufficient observation or coarse granularity of collection method. As described in more detail later, the present invention involves three evaluation techniques that can be incorporated into the beaconing detection mechanism previously disclosed by the present inventors, a mechanism that permits data to be aggregated over different periods of time. This second evaluation technique can be viewed as an application of communications theory to determine whether different granularities of data are providing useful information, as inspired by considering the input data to be data points of an analog signal and using concepts derived from the Nyquist Theorem to evaluate the adequacy of different observation granularities.

3. Gaussian Mixture Model Processing Procedure

The Gaussian Mixture Model Processing Procedure 108 identifies multiple interleaved periodicities and automatically determines the number of periodic components using mixture models and information criterion.

This third evaluation procedure can be viewed as a second application of statistical theory to evaluate data for potential beaconing behavior detection, with this second application providing some overall quantitative meaning to the input data as a whole.

Thus, as will be more clear following the more complete description below, the present invention can be considered as considering beacon-detecting data as various data points of a received signal, so that various statistical and communication theory principles can be applied to this beacon-detecting data as if a communication signal was received and being evaluated. The three methods 104, 106, 108, summarized above and shown exemplarily in FIG. 1, are three such methods.

Although FIG. 1 shows these three processing procedures as a defined sequence of processing procedures that refine the input data 102 into periodicity information 110, 112 as output by detecting false positives 105, including inadmissible and/or presumably invalid periodicities, the present invention should not be considered as confined to this exemplary embodiment since any of the three processing procedures 104, 106, 108 can independently be utilized as a method to improve determination of periodicities in beaconing detection systems. The specific sequence of the three processing procedures 104, 106, 108 shown in FIG. 1 is also exemplary but is considered by the present inventors as a preferred embodiment since this sequence provides an efficient and logical sequence to systematically remove false positives 105 from the input data to thereby provide input data for the more-processing-intensive third processing procedure 108 that detects/determines multiple interleaved periodicities 110.

Figure 2:
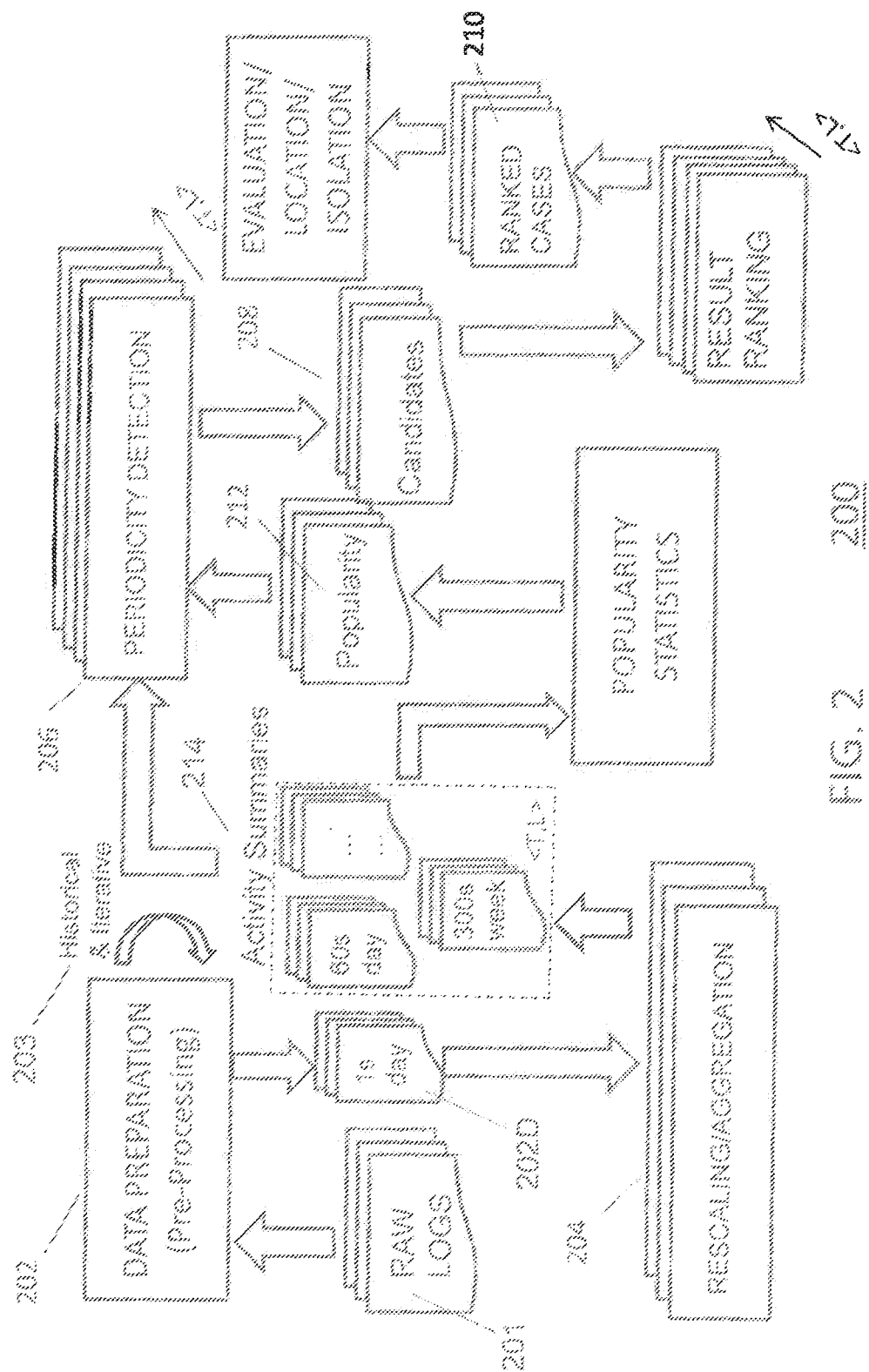
FIG. 2 shows an overview of the beaconing detection mechanism 200 previously disclosed by the present inventors, used herein as a beaconing detection tool into which the methods of the present invention can be incorporated.

Additional details of each of these three processing procedures 104, 106, and 108 will be provided shortly, but the significance of periodicity detection in beaconing detection methods can be better understood by noting how these three procedures could be incorporated into an existing beaconing detection system such as that of the present inventors' own method described in the co-pending application and exemplarily shown in FIG. 2. This method 200 uses rescaling and aggregation 204 of input raw data 201 to improve beaconing detection, and one or more of the three processing procedures 100 of FIG. 1 of the present invention could be incorporated in this beaconing detection method 200 as one or more evaluation component(s) that might be useful once the period candidates have been identified in module 208.

Briefly, as shown in FIG. 2, the present inventors previously disclosed a beaconing detection mechanism 200 that includes temporal resolution T and analysis length L (e.g., time range), as demonstrated by the symbol "<T.L.>" in various places in FIG. 2. This figure also shows various specific exemplary values. For example, the symbology "1s day" means 1 second resolution (granularity) and 1 day aggregation, which indicates that the data is resolved in 1 second periods over daily intervals.

In the first step 202, data pre-processing is performed on raw network observations 201, in which source and destination identifiers, as well as time stamps of every observation are extracted, to produce a compact representation of the past network activity over the current aggregation interval period of time. The pre-processing resolution/aggregation 202D is "1s day", although it should be clear that these specific resolution and aggregation values are non-limiting and used only for purpose of explaining the mechanism. More generically, the output of the data preparation step 202 will typically be the finest possible resolution over a specific time interval. The specific values for resolution/aggregation are parameters which can be set by operator inputs or could operate using default values, as selectively modified by user inputs.

In the second step 204, the resulting representation is rescaled and aggregated into lower time resolution and longer time windows to enable scalable detection of periodicities over longer time intervals. Examples are shown in the activity summaries 214 in FIG. 2, but it should be clear that user input could provide different resolution/aggregation values, that standard default values could be used or selectively used, or even that a controller (not shown) could automatically define/modify these resolution/aggregation values for the activity summaries 214.

The label "Historical & Iterative" 203 indicates that either the prepared data 202D from the data preparation stage 202 or the activity summary 214 data, and preferably both, could be stored in a historical database, so that longer historical data can be used in conjunction with output data 202D of a current preprocessing period, to further extend the length of aggregation/analysis length (time range) to include previous activity periods.

In the third step 206, periodicity detection is performed on the <T, L> sets of data, including the initial pre-processed data of the most current aggregation periods, in the frequency domain, to provide candidate source and destination identifier pairs which exhibit periodic behavior.

In the fourth step 208, candidate results are then further evaluated and ranked in a modular fashion, meaning that additional independent characteristics are introduced to further evaluate the candidate pairs. In the exemplary embodiment shown in FIG. 2, the effects of at least the characteristics of popularity 212 and domain lexical analysis (not shown in FIG. 2), as well as interval statistics. Popularity statistics 212 provide one of the modular characteristics and are used to assess the influence of locally popular destination identifiers.

In the fifth step 210, an administrator or other user can evaluate the rankings output from the process.

Figure 3:
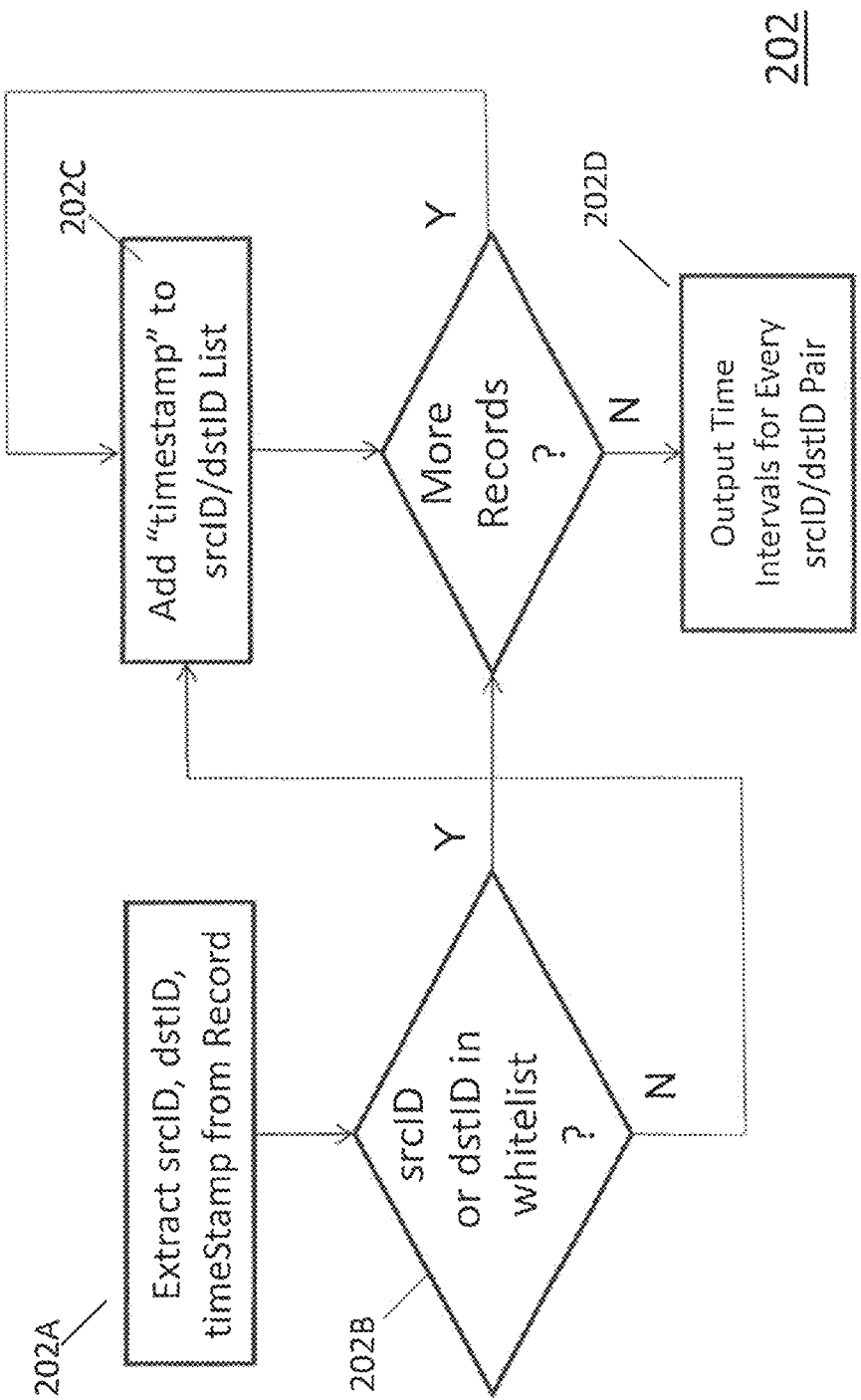
FIG. 3 illustrates the data preparation, or pre-processing, step 202 of the exemplary embodiment 200 of the co-pending application directed to beaconing detection.

Breaking down these high-level steps shown in FIG. 2 into a bit more detail, FIG. 3 exemplarily illustrates the data preparation, or pre-processing, step 202. In this step 202, raw network observations and logs (including, for example, HyperText Transfer Protocol (HTTP) proxy logs, firewall logs, NetFlow, raw packet capture, etc.) are analyzed and translated into a time-interval-based representation (Activity Summaries 214). Every network observation generally consists of multiple identifier fields and time information. The preparation process is generic and enables configuration of the fields to be used as a source identifier and a destination identifier. Typical source identifiers may comprise, but are not limited to, source Internet Protocol (IP) addresses, Media Access Code (MAC) addresses, source device identifiers, and user names. Typical destination identifiers may include, but are not limited to, destination IP addresses, destination domain names, Uniform Resource Locators (URLs), port numbers, peers (e.g., IP+port, domain name+port) and protocols.

In the first substep 202A, for every record, source and destination information is extracted along with a time stamp. In the next substep 202B, verification is made whether either the present source and/or the destination identifier appears in a white list, understood in the art as a listing of sources/destinations considered as posing no threat. That is, a white list for a site would contain a number of benign (i.e., known non-malicious) beaconing activities, such as routine application program update requests, that are registered as safe beaconing to known safe sites.

If the white list verification is positive, the record is excluded from further evaluation, in order to reduce the amount of processing of site network activity to only those source/destination identifiers not listed on the white list as known safe sites. Otherwise, in substep 202C the time stamp is extracted and added to a list of time stamps for a given source/destination ID pair. Substeps 202A, 202B, and 202C are repeated for all records.

After processing all records, a sequence of time intervals is output for every pair, in substep 202D. It is noteworthy to mention that the data preparation step 202 has to be run only once for every observation time interval and can output time intervals for different source/destination field configuration simultaneously (e.g. source IP→destination IP, source MAC→domain name, etc). In a preferred embodiment, this illustrated process is iterative and adds additional pre-processed output to a data repository (Activity Summaries) when new raw logs are available. Thus, the method of FIG. 2 can be used in a manner that historical data can be stored in a database, so that the database can be periodically updated every time a new data preparation step 202 is executed on a location. Such mechanism clearly permits the present invention to detect possible threats over longer time scale for which data exists and/or is stored for that location.

The second step 204 from FIG. 2, of rescaling/aggregation takes output from step 202 (and any previous runs of step 204) and modifies time resolutions of the intervals for every source/destination ID pair and performs temporal aggregation over multiple time windows, to thereby form a plurality of temporal resolution, analysis length/time range (<T,L>) sets that are then selectively processed by remaining stages. A time resolution may be modified to lower resolutions (where lower resolutions are multiples of the input resolution), e.g., from 1-second resolution to 10-second resolution, from 10-second resolution to 60-second resolution. Temporal aggregation merges longer time windows (represented as separate files in the input) into a single sequence of time intervals for every source/destination ID pair, e.g., aggregating over days, weeks, or months. In a preferred exemplary embodiment, the rescaling/aggregation of data from a shorter time interval into a longer time interval, the longer time interval will merely reflect that at least one incident occurred in the longer time interval and would not provide details about whether multiple incidents occurred in the longer time interval.

The output of step 204 is interval information at various time scales, as indicated by the activity summaries 214. It should be clear that the resolutions and aggregations shown in FIG. 2 are exemplary and that any number of other values would be possible. It should also be clear that the specific values for resolution/aggregation could be controlled by operator input parameters, with possibly default values.

In the periodicity detection step 206, the interval information 206 at various time scales is now analyzed for periodicities. In this co-pending application, the periodicity detection step 206 takes the time intervals for source and destination ID pairs and applies a frequency analysis approach, meaning that the time interval data is converted into the frequency.

From the above brief summary, it should now be clear that the three processing procedures shown exemplarily in FIG. 1 as a preferred embodiment of the present invention could be implemented as potentially different components in an existing beaconing detection tool, such as, for example, using one or more of the methods as an evaluation module following the candidate identification module 208.

The Statistical Hypothesis Testing Procedure

Figure 4:
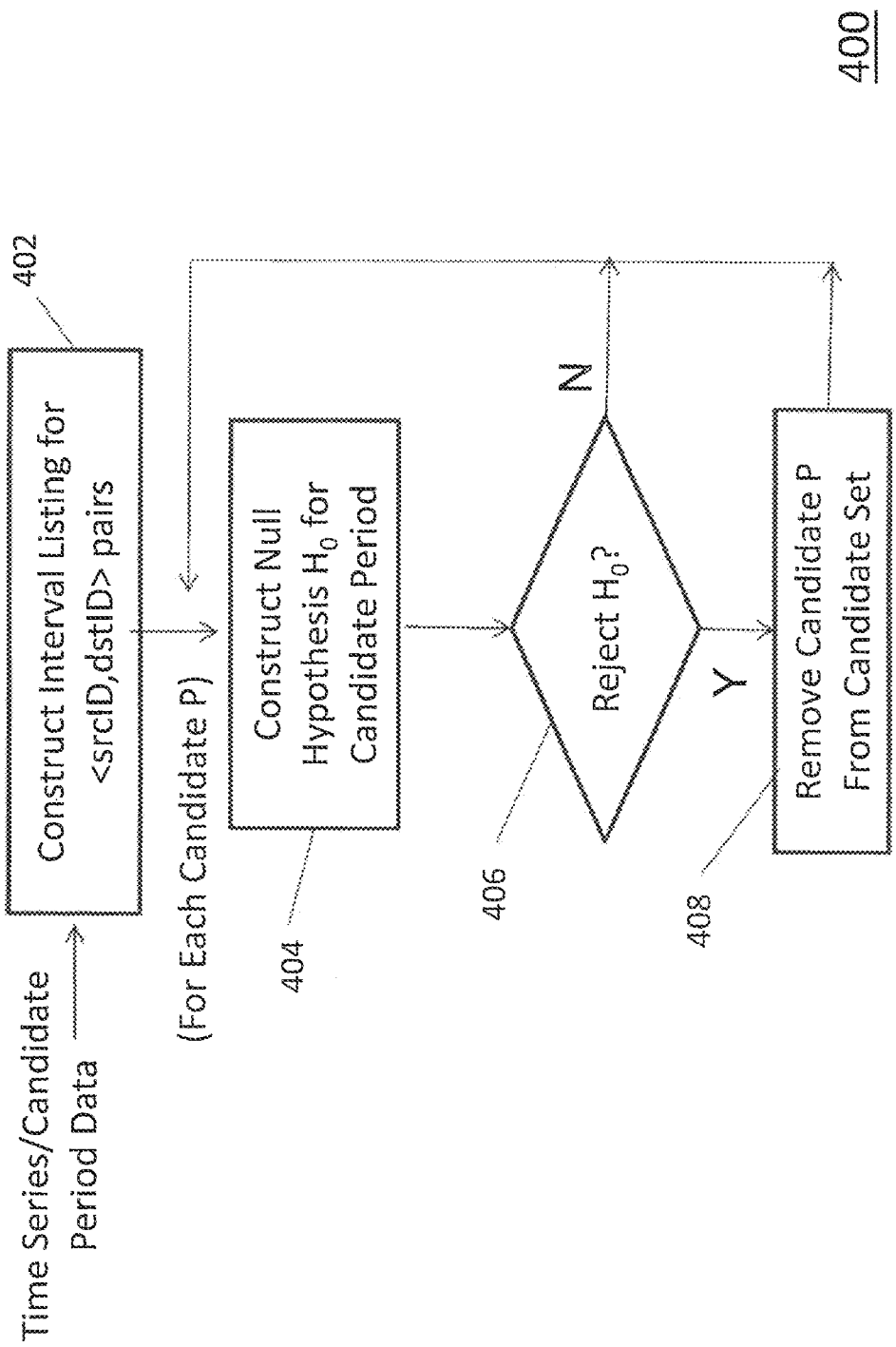
FIG. 4 illustrates in flowchart format 400 an exemplary embodiment of the statistical hypothesis testing processing procedure 104 of the present invention.

The first processing procedure 104 shown in FIG. 1 is a pruning procedure. FIG. 4 shows details of this pruning processing procedure, the "statistical hypothesis testing" 104. The candidate periods discovered by existing beaconing algorithms often include high-frequency noise components. To identify such cases, this module 104 of the present invention converts the time series data into an interval list I={$i_1, i_2, \ldots, i_n-1$} in step 402, where each $i_k$ is the time interval between two consecutive connections. Thus, the data being evaluated is interval data between a source/destination pair, as obtained in the pre-processing step 202 shown in FIG. 2. Analyzing the statistics of the interval list often allows this module to effectively prune impossible or unlikely candidates.

To do this, a hypothesis testing algorithm is designed to determine the statistical significance of the candidate periods given the observed intervals. The algorithm is an instantiation of the one-sample t-test and works as follows:

For each candidate period P, the null hypothesis $H_0$ is constructed (step 404) to be "P is the true period of the original time series", which is to say that the connection between source and destination is periodic at an interval of P seconds. Due to various noises in the real world scenario (e.g., network delays, retransmission, context switching, etc.), the observed intervals are often not exactly P seconds. Instead, the distribution of the observed intervals can be modeled as a random variable N (P, $\sigma^2$).

In other words, the candidate intervals are presumed to have been generated from an underlying normal distribution with mean $\mu_0$=P and noise induced variance $\sigma^2$. The goal of the hypothesis testing processing is to decide, given a predefined significance level $\alpha$ and the set of observations, whether to reject the null hypothesis $H_0$ in favor of the alternative hypothesis ($H_1$: P is not the true period).

More specifically, a one-sample t-test is applied on the observed intervals and the p-values are calculated. The statistic used is: where x is the sample mean and s is the sample standard deviation of observed intervals. Then the p-value is calculated as the probability, under the null hypothesis, of sampling a test statistic at value P. An input period P as potential candidate period is rejected (step 406) and removed (step 408) from the candidate set if the p-value is smaller than the chosen significance level, such as, for example, $\alpha$=5%.

One of the major benefits of applying hypothesis testing in the pruning steps of the three-stage processing of FIG. 1 is its conservativeness. That is, the null hypothesis $H_0$ is rejected only when there is significant evidence against it. Therefore, the risk of mistakenly eliminating a true period is small.

The Under-Sampled Time Series Procedure

Figure 5:
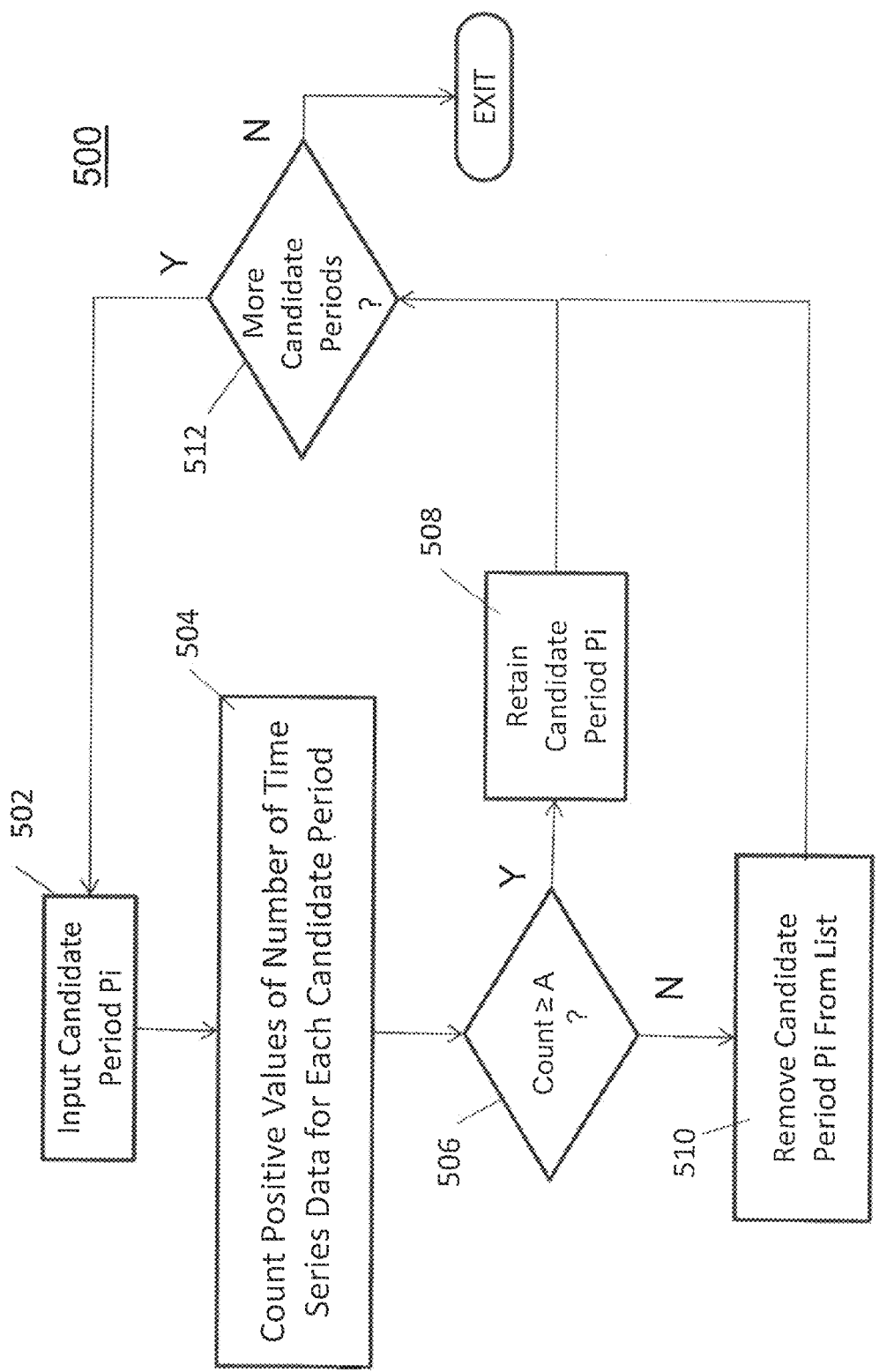
FIG. 5 illustrates in flowchart format 500 an exemplary embodiment of the sampling rate detection processing procedure 106 of the present invention.

FIG. 5 shows in flowchart format 500 the second processing procedure 106 shown in three-stage processing mechanism exemplarily shown in FIG. 1, also a pruning of data, but this time a pruning of candidate periodicities.

This second pruning procedure involves a criterion to remove false detection based on the sampling rate defined by the Nyquist Theorem, which is used to filter out time series in the beaconing detection data that are under-sampled. This is particularly important when the beaconing detection algorithm rescales an aggregated time series into coarser granularity for better scalability over long time period, as exemplarily shown in the exemplary mechanism shown in FIG. 2.

According to the Nyquist Theorem, one can accurately measure the frequency f of a signal only when the sampling rate is at least 2*f (called the "Nyquist frequency"). Otherwise, false images of the signal may be created at frequencies below f. For example, assuming the beaconing behavior is periodic every 30 seconds. If the sampling rate is higher than once every 15 seconds (or data aggregation in buckets of 15 seconds or less), the resulting time series will consist of both peaks ("1") and valleys ("0") that allows accurate measurement of the true frequency.

In contrast, when the sampling rate is smaller than the Nyquist frequency, equivalently, (e.g., the data aggregated in 20-second buckets), the resulting time series may consist of only peaks ("1"s), leading to an incorrect detection of periodicity. Therefore, this second pruning processing module 106 identifies a potentially under-sampled signal through examining its interval lists. If more than a preset ratio, for example, 80%, of intervals are non-zero, meaning that the signal has peaks at most time units, the candidate periodicities are pruned because of the lack of visibility into the signal's inherent structure presumed to be due to coarse-grained sampling.

In step 502 of FIG. 5, time series data points for a specific source/destination pair is input as potentially representing an input candidate period $P_i$. The number of positive values in this candidate period $P_i$ is counted in step 504 and this count is compared in step 506 with a pre-set count value A, so that the candidate period $P_i$ can be either retained (step 508) or eliminated (step 510) as a candidate period. In step 512, the process continues until all candidate periods have been processed.

As a more concrete example of this application of communication theory, assume the following observed activity intervals (interval list): [8, 17, 27, 38, 51, 61, 82, 92, 101, 107, 119, . . . ]

With this presumed interval list, an example of bad sampling would be one using activity buckets at a 10 second granularity (temporal resolution T=10), as follows: [1, 1, 1, 1, 0, 1, 1, 0, 1, 1, 2, 1, . . . ] In contrast, an example of good sampling would be activity buckets at 2 second granularity (temporal resolution T=2): [0, 0, 0, 1, 0, 0, 0, 1, 0, 0, 0, 0, 1, 0, . . . ]

The Gaussian Mixture Models Processing

One major challenge in mining data for periodic behavior is that the time series may have multiple interleaved periods. Because the intervals observed from multiple periodic behavior are often separated into multiple sets, a beaconing algorithm that assumes a single underlying behavior period will likely reject every candidate period due to any mixed distribution that might be present in the data.

The present invention addresses this challenge by employing the Gaussian Mixture Model (GMM) on the observed interval lists. The GMM is a probabilistic model that assumes all the data points are generated from a mixture of a finite number of Gaussian distributions with unknown parameters. It uses the iterative expectation maximization (EM) algorithm to estimate the parameters of each Gaussian component. The number of underlying Gaussian components is selected to be the one that minimizes the Bayesian Information Criterion (BIC).

Figure 6:
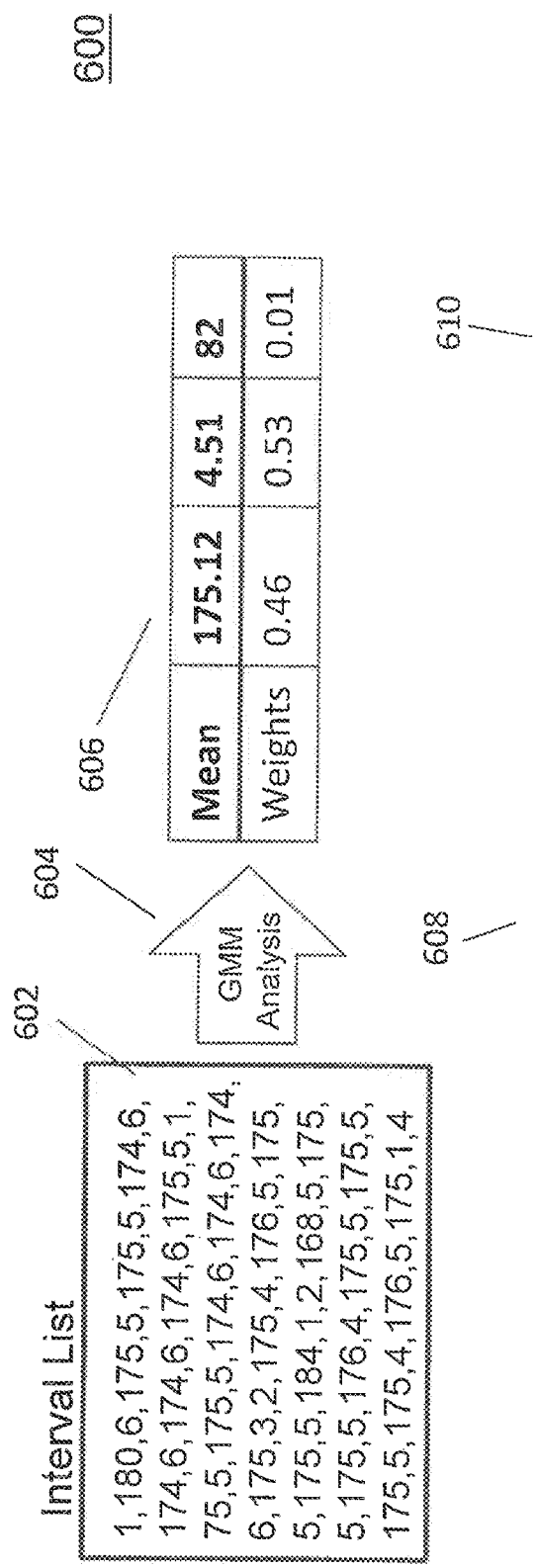
FIG. 6 illustrates exemplary data 600 and calculation results 610 of the Gaussian Mixture Models processing procedure 108 of the present invention.
Figure 6:
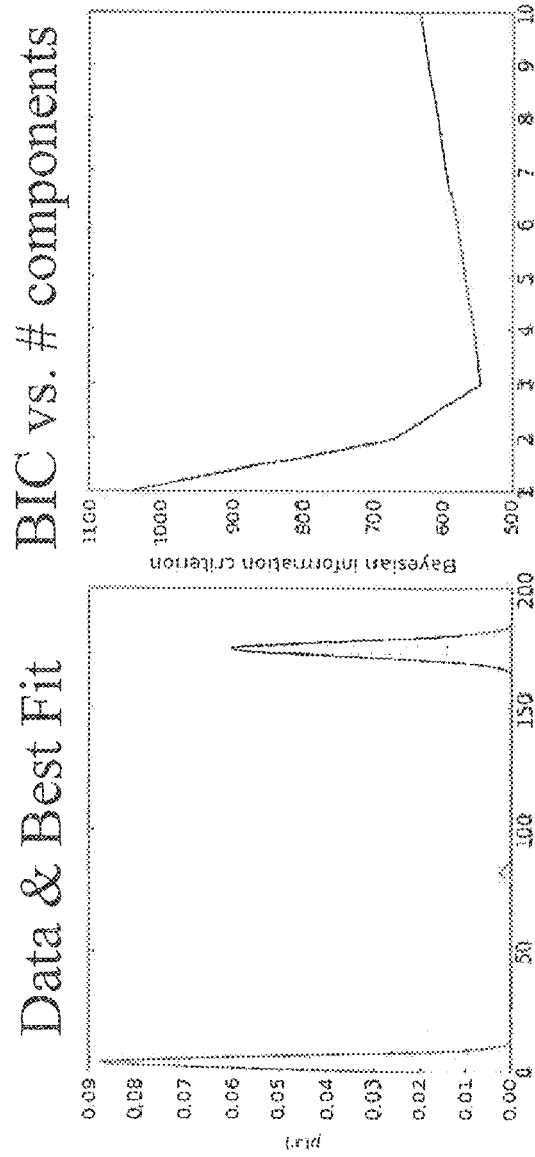

FIG. 6 demonstrates this method using an exemplary interval listing input data 602 that the histogram of the observed intervals along with the best-fit GMM model. The rightmost plot 610 shows the BIC value as a function of the number of components which minimizes for a three component model. The mean ($\mu$) of each Gaussian components and percentage of data points that belong to each component (i.e., weights) are summarized in the table 606 above the two plots 608,610. The GMM model 604 successfully identifies the two main components shown exemplarily in plot 608 indicating that there are likely two interleaved periodicities. Both the GMM and BIC tools are readily available, so this third processing involves providing interval list data into these tools with output data providing results similar to that shown exemplarily in FIG. 6.

FIGS. 1-6 explain methods underlying exemplary embodiments of the present invention.

Figure 7:
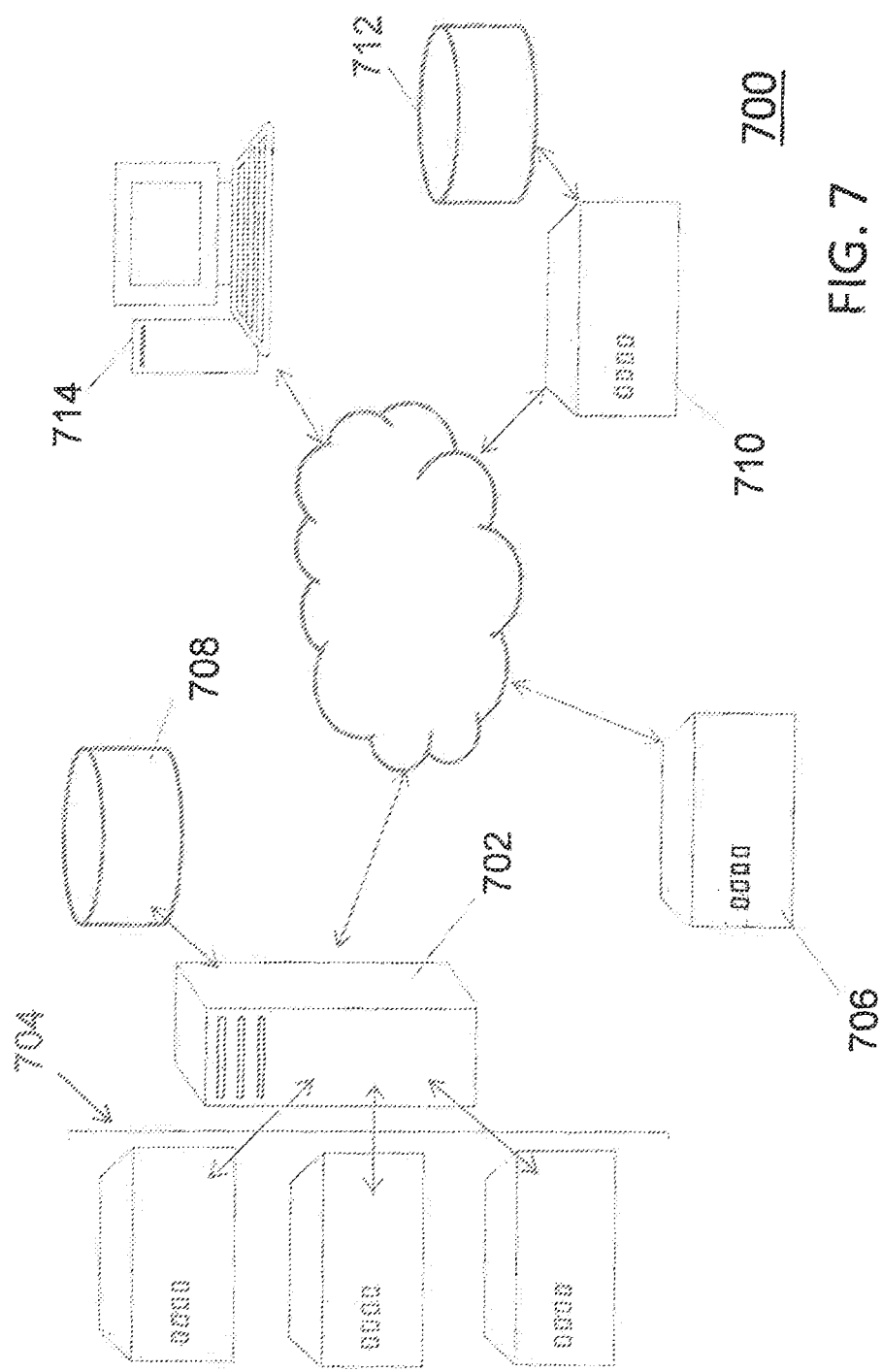
FIG. 7 illustrates exemplary variations 700 for implementing the present invention in a network, including one providing an APT monitoring as a cloud service.

FIG. 7 shows details 700 of exemplary implementations of the invention in a network. As initially developed, the beaconing detection system 200 exemplarily illustrated in FIG. 2 was intended to be an application-type program selectively executable on a server 702 or gateway that serves as a portal to a protected site or network 704. Since the invention serves a monitoring purpose, it would be preferable to periodically execute the process described in FIGS. 1-6, either under control of a user or administrator or as automatically executed once during a predefined interval such as daily or weekly, etc. Such automatic execution could be implemented, for example, by configuring the application program to execute using a signal from the operating system of the computer 702. Other mechanisms for automatic periodic execution could include receipt of an initiation signal from a remote location 706.

Computer 702 is also shown as associated with a database 708 for storing data from the periodic executions. Such data would permit the system to evaluate longer periods of time, using stored data from previous cycles as well as the data from the current execution period.

In a variation, the tooling of the present invention could be installed on a single computer 710 and providing APT monitoring for that computer alone, with computer 710 possibly having a memory device 712 for storage of APT monitoring history.

FIG. 7 also demonstrates another variation of the present invention in which the evaluation program including the three evaluation modules described herein is offered as a service to other sites desiring to implement their APT monitoring and detecting by the method of the present invention. In this variation, which could even be implemented as a cloud service, the APT detection tool of the present invention is configured to communicate with another computer 714 for which APT monitoring is desired. Computer 714 would provide data for evaluation to the computer on the network executing the APT monitoring, such as computer 702 or 710. The results of the evaluation could be returned to the remote computer 714 for action by a user/administrator at that remote location, or, possibly, the program execution computer 702,710 could communicate with the remote computer 714 for automatic location/disposition of potential threats. The data resultant from an evaluation of the remote computer 714 by the program on computer 702,710 could be returned to computer 714 for evaluation and/or storage, or it could be stored in database 708,712 associated with computer 702,710.

In yet another alternative, computer 702 could be configured to download the APT monitoring tool to remote computer 714 via a network, either by request or via an automatic, periodic downloading mechanism, in order to permit remote computer 714 to itself execute the APT monitoring tool. Typically, as a servicing tool for client users, the APT monitoring tool would be configured for a single execution by the remote computer 714 and would not remain resident in the remote computer 714, as well as possibly other safeguards to preclude the evaluation tool to be transferred to another computer without authorization.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other types of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
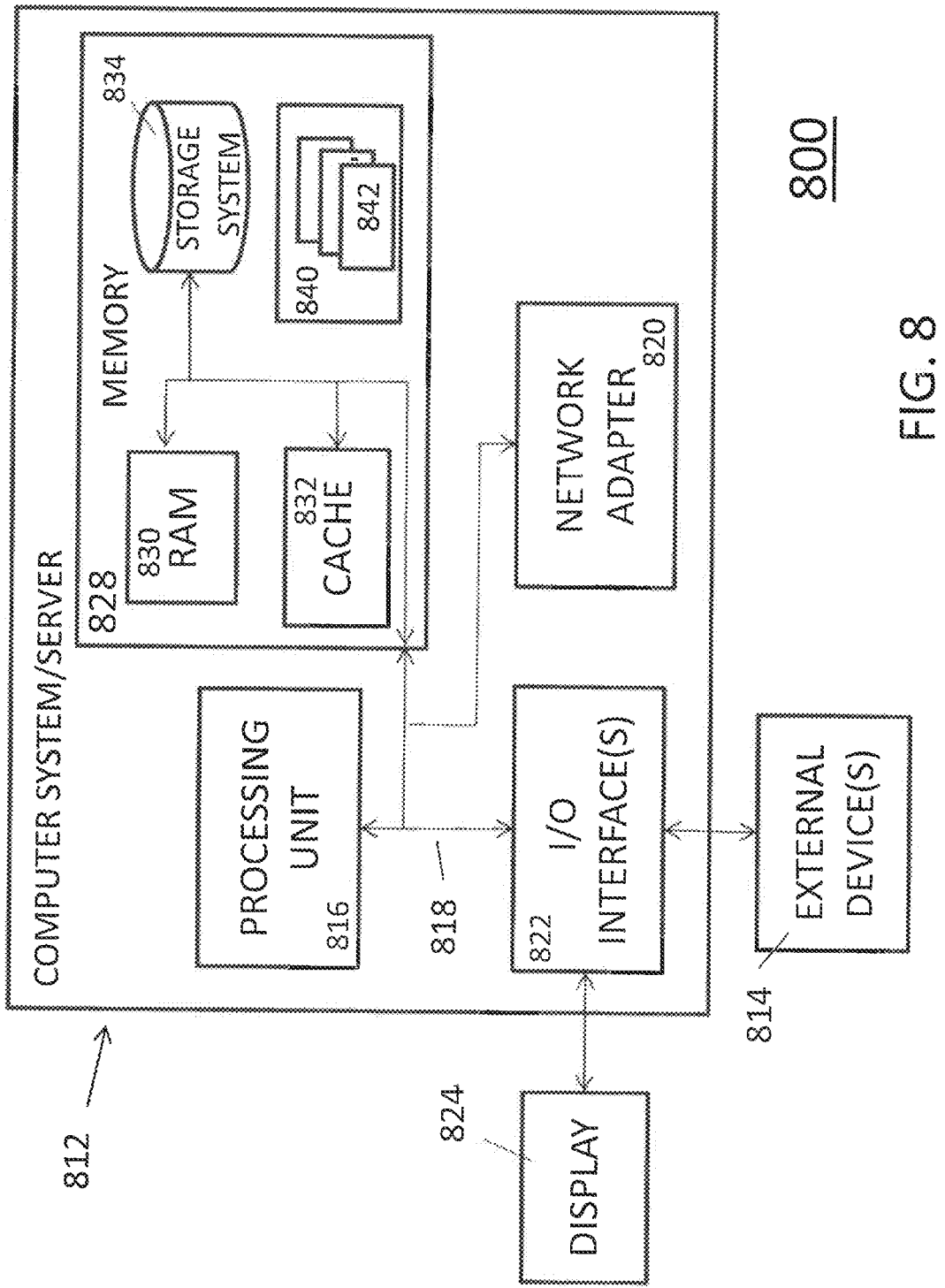
FIG. 8 depicts a cloud computing node 800 according to an exemplary embodiment of the present invention.

Referring now to FIG. 8, a schematic 800 of an example of a cloud computing node is shown. Cloud computing node 800 is only one example of a suitable cloud computing node and is not intended to suggest any limitation as to the scope of use or functionality of embodiments of the invention described herein. Regardless, cloud computing node 800 is capable of being implemented and/or performing any of the functionality set forth hereinabove.

In cloud computing node 800 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 800 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
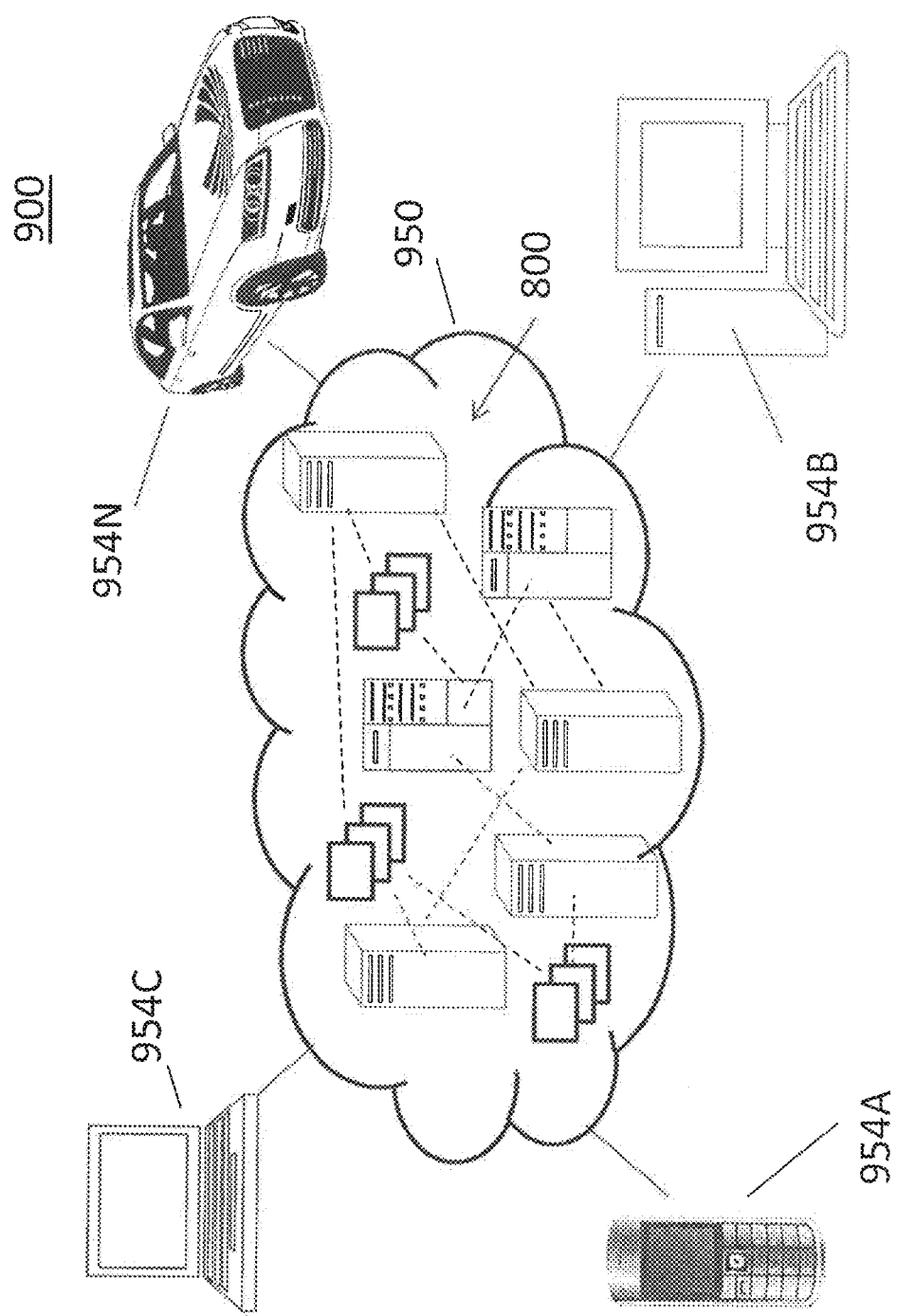
FIG. 9 depicts a cloud computing environment 900 according to an exemplary embodiment of the present invention.

Referring now to FIG. 9, an illustrative cloud computing environment 950 is depicted. As shown, cloud computing environment 950 comprises one or more cloud computing nodes 800 with which local computing devices used by cloud consumers, such as, for example, personal digital assistant (PDA) or cellular telephone 954A, desktop computer 954B, laptop computer 954C, and/or automobile computer system 954N may communicate. Nodes 800 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 800 and cloud computing environment 950 can communicate with any type of computerized device over any type of network and/or network addressable connection (e.g., using a web browser).

Figure 10:
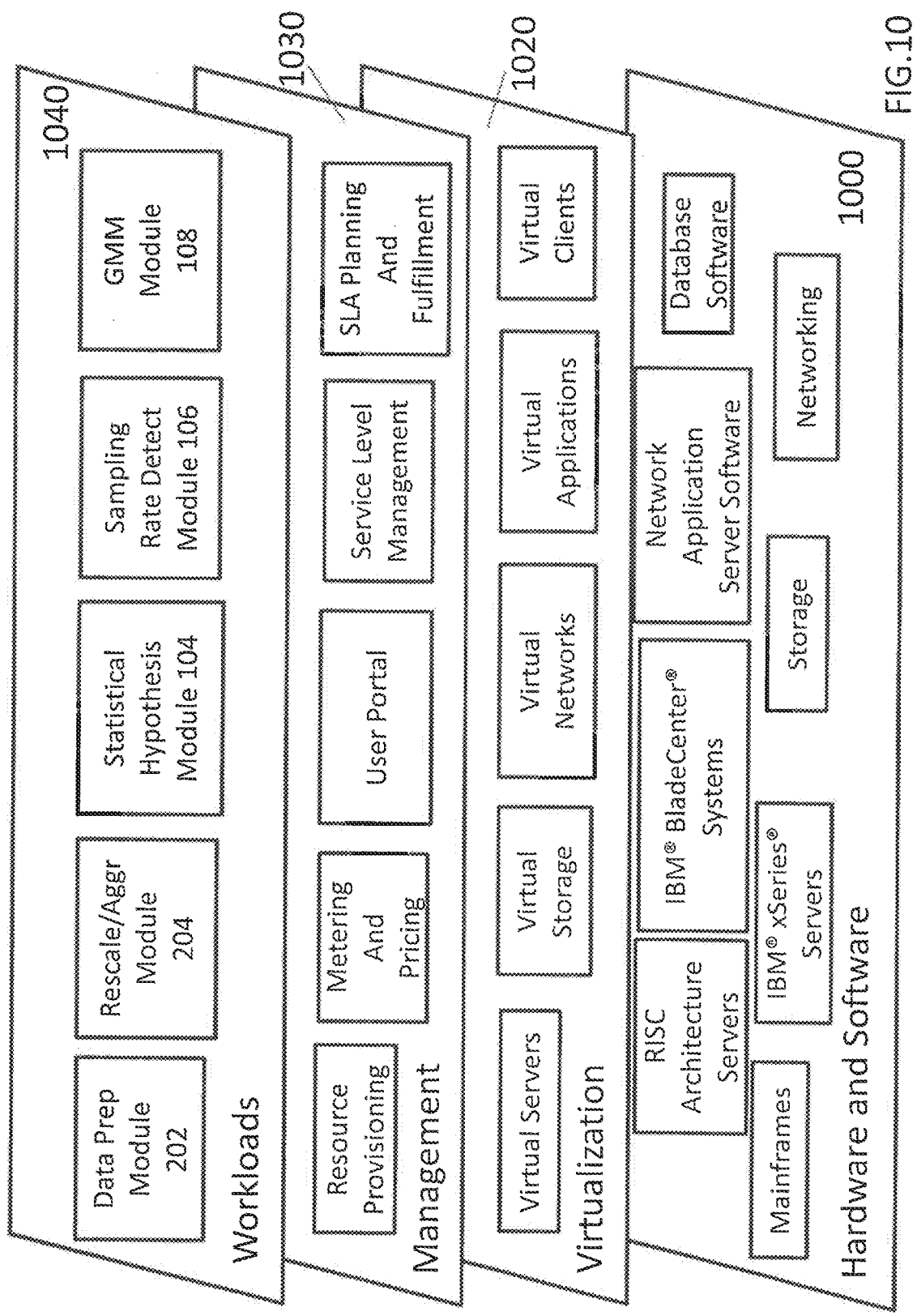
FIG. 10 depicts abstraction model layers 1000-1040 according to an exemplary embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1000 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 1000.

Virtualization layer 1020 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 1020.

In one example, management layer 1030 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1040 provides examples of functionality for which the cloud computing environment may be utilized. Examples of workloads and functions which may be provided from this layer include any number of functions and applications, such as mapping and navigation; software development and lifecycle management; virtual classroom education delivery; data analytics processing; transaction processing; and, more particularly relative to the present invention, the beaconing detection modules 104,106,108 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting beaconing activity, the method comprising:
   receiving, as input data into a computer-implemented processing procedure, at least one listing of time series data and candidate periods of potential beaconing activity;
   processing the input data, using a processor on a computer, to detect candidates of potential beaconing activity; and
   improving a performance of the detecting of potential beaconing activity to at least one of eliminate false positive indications of beaconing activity and provide indication of multiple interleaved periodicities of beaconing, by further evaluating the listing of time series data using techniques used for evaluating an analog signal by considering the input data as data points of the analog signal in a digital domain.

2. The method of claim 1, wherein the further evaluating comprises evaluating the listing of time series for statistical characteristics and wherein times that fall outside a pre-set statistical measurement are eliminated from being potential candidates of beaconing activity, and considering the input data to be data points of the analog signal and evaluating an adequacy of different observation granularities.

3. The method of claim 2, wherein the evaluating for statistical characteristics comprises listing the time series data as a list of time intervals between two consecutive connections, and
wherein further evaluating the listing of time series data of an analog signal is to detect under-sampled time series.

4. The method of claim 3, wherein the evaluating for statistical characteristics comprises executing an instantiation of a one-sample t-test wherein a null hypothesis $H_0$ is constructed and the list of time intervals is presumed due to an underlying normal distribution with a mean $\mu 0 = P$ and noise induced variance $6\sigma^2$, and a goal of the processing is to decide, given a predefined significance level $\alpha$ and the set of input data, whether to reject the null hypothesis $H_0$ in favor of an alternative hypothesis $H_1$: P is not the true period.

5. The method of claim 4, wherein the evaluation of statistical characteristics serves as a first pruning processing, the method further comprising a second pruning processing wherein a listing of candidate period is evaluated based on a predetermined time interval and the listing is eliminated if more than a pre-set number of points of the candidate period listing are non-zero.

6. The method of claim 3, wherein the further evaluating comprises evaluating the list of time intervals between two consecutive connections as a listing of candidate periods at a specific granularity and the listing is eliminated if more than a pre-set number of points of the candidate period listing at the specific granularity is non-zero, indicating an under sampling of data under a Nyquist Theorem sampling requirement and is accepted as a listing at the specific granularity if the number of points is less than the pre-set number, and
wherein the further evaluating includes by considering the input data to be data points of the analog signal and using the Nyquist Theorem to evaluate the adequacy of different observation granularities.

7. The method of claim 1, wherein the further evaluating comprises:
evaluating a listing of time series data for potential multiple interleaved periods, using a Gaussian Mixture Model (GMM) analysis and as selected using a minimum Bayesian Information Criterion (BIC); and
filtering out time series in the beaconing detection data that are under-sampled.

8. The method of claim 1, further comprising:
preprocessing network records to identify candidate source and destination pairs for detecting beaconing behavior, each source and destination pair being associated with specific time intervals in a plurality of time intervals forming a time range, the time interval and time range having been predefined;
converting the activity time interval information from a time domain into a frequency domain; and
determining candidate frequencies from the source and destination pairs, as likely candidate frequencies/periodicities of beaconing activities.

9. The method of claim 8, further comprising:
prior to the converting into the frequency domain, rescaling/aggregating time intervals such that a plurality of data sets with different time interval resolutions/time ranges are included in the plurality of time intervals for each source and destination pair; converting the plurality of data sets into the frequency domain; and
analyzing activity time interval information for each source and destination pair.

10. The method of claim 1 as executed in one of:
a network server or gateway that monitors network activity for a web site or a local area network;
a server or computer accessible for providing monitoring services to client computers or networks that are selectively connected to the server; and
a cloud service.

11. A non-transitory computer readable storage medium including program instructions embodied therewith, the program instructions readable and executed by a computer to cause the computer to perform the method according to claim 1.

12. The computer readable storage medium of claim 11, comprises one of:
a memory device on a computer currently executing the method;
a memory device on a computer that selectively executes the method;
a memory device on a computer that selectively dispatches the computer-readable instructions to another computer via a network; and
a standalone, non-transitory memory device that stores the computer-readable instructions to be uploaded into a computer memory via an input port.

13. An apparatus, comprising:
a memory device; and
a processor having access to the memory device, the memory device storing a series of machine-readable instructions to execute a method of detecting beaconing behavior,
wherein the method comprises:
receiving, as input data into a computer-implemented processing procedure using the processor, at least one listing of at least one of time series data and candidate periods of potential beaconing activity;
processing the input data, using a processor on a computer, to detect candidates of potential beaconing activity; and
improving a performance of the detecting of potential beaconing activity to at least one of eliminate false positive indications of beaconing activity and provide indication of multiple interleaved periodicities of beaconing, by further evaluating the time series data by considering the input data as data points of an analog signal in a digital domain.

14. The apparatus of claim 13, as comprising one of:
a server or gateway serving as a network portal for a local network of computers, to execute the method for the local network;
a server on a network accessible via the network and that provides a service of executing the method to another computer on the network, to execute the method as based on data supplied by the other computer; and
a server on a network accessible via the network and that provides a service of executing the method to another computer on the network, to execute the method as based on data supplied
by the other computer, as a cloud service.

15. The apparatus of claim 13, wherein the further evaluating of the input data comprises one or more of:
evaluating a listing of time series for statistical characteristics and times that fall outside a pre-set statistical measurement are eliminated;

evaluating a listing of candidate periods and the listing is eliminated if more than a pre-set number of points of the candidate periods listing are non-zero as a specific granularity, as failing a Nyquist Theorem sampling requirement; and evaluating time series data for potential multiple interleaved periods, using a Gaussian Mixture Model (GMM) analysis and as selected using a minimum Bayesian Information Criterion (BIC).

16. The apparatus of claim 15, wherein the further evaluating comprises all three of the evaluations, as executed in a sequence of order as recited.

17. The apparatus of claim 15, wherein the method further comprises:
preprocessing network records to identify candidate source and destination pairs for detecting beaconing behavior, each source and destination pair being associated with a specific time interval in a plurality of time intervals forming a time range, the time interval and time range having been predefined;
converting the activity time interval information from a time domain into a frequency domain; and
determining candidate frequencies from the source and destination pairs, as likely candidate frequencies/periodicities of beaconing activities.

18. A method of deploying computer resources, the method comprising provisioning a memory device in a server accessible via a network with a set of computer-readable instructions for a computer to execute a method detecting beaconing behavior, wherein the method of detecting beaconing behavior comprises:
receiving network records for a site being evaluated beaconing behavior;
preprocessing the network records to identify candidate source and destination pairs for detecting beaconing behavior, each source and destination pair being associated with a specific time interval in a plurality of time intervals forming a time range, the time interval and time range having been predefined;
receiving, as input data into a computer-implemented processing procedure using a processor, at least one listing of at least one of time series data and candidate periods of potential beaconing activity;
processing the input data, using a processor on a computer, to detect candidates of potential beaconing activity;
improving a performance of the detecting of potential beaconing activity to at least one of eliminate false positive indications of beaconing activity and provide indication of multiple interleaved periodicities of beaconing, by further evaluating the time series data using techniques used for evaluating an analog signal by considering the input data as data points of the analog signal in a digital domain; and
after the further evaluating for improving the performance, determining candidate frequencies from the source and destination pairs as likely candidate frequencies/periodicities of beaconing activities,
wherein the further evaluating for improving the performance of the detecting comprises one or more of:
evaluating a listing of time series for statistical characteristics and times that fall outside a pre-set statistical measurement are eliminated;
evaluating a listing of candidate periods and the listing is eliminated if more than a pre-set number of points of the candidate periods listing are non-zero at a specific granularity as failing a Nyquist Theorem sampling requirement; and
evaluating the time series data for potential multiple interleaved periods, using a Gaussian Mixture Model (GMM) analysis and as selected using a minimum Bayesian Information Criterion (BIC).

19. The method of deploying computer resources of claim 18, wherein the server provides one of:
executing the method of detecting beaconing behavior based on network data received from a local area network of computers for which the server serves as a network portal;
receiving a request from a computer via the network to execute the method of detecting beaconing behavior, receiving data from the requesting computer to be processed by the method of detecting beaconing behavior, and returning to the requesting computer a result of executing the method of detecting beaconing behavior on the received data; and
receiving a request from a computer via the network to execute the method and transmitting the set of computer-readable instructions to the requesting computer to execute the method of detecting beaconing behavior.

20. The method of deploying computer resources of claim 18, wherein the server provides a service of executing the method of detecting beaconing behavior as a cloud service.

* * * * *